United States Patent [19]

Bienvenu, Jr.

[11] Patent Number: 5,531,274

[45] Date of Patent: Jul. 2, 1996

[54] LIGHTWEIGHT PROPPANTS AND THEIR USE IN HYDRAULIC FRACTURING

[76] Inventor: Raymond L. Bienvenu, Jr., 4500 19th St. #48, Boulder, Colo. 80304

[21] Appl. No.: 282,905

[22] Filed: Jul. 29, 1994

[51] Int. Cl.$^6$ ................................................ E21B 43/267
[52] U.S. Cl. ........................................ 166/280; 166/308
[58] Field of Search ................................ 166/280, 308, 166/227, 310

[56] References Cited

U.S. PATENT DOCUMENTS

| | | | |
|---|---|---|---|
| 4,670,166 | 6/1987 | McDougall et al. | 166/310 X |
| 4,777,154 | 10/1988 | Torobin | 166/280 X |
| 4,888,240 | 12/1989 | Graham et al. | 166/280 X |
| 5,339,895 | 8/1994 | Arterbury et al. | 166/227 |

*Primary Examiner*—William P. Neuder
*Attorney, Agent, or Firm*—Steven C. Petersen; Chrisman, Bynum & Johnson

[57] ABSTRACT

The present invention relates to a high strength proppant having a specific gravity of less than 1.3 that can be used in hydraulic fracturing operations of oil and gas wells.

9 Claims, 4 Drawing Sheets

LIGHTWEIGHT PROPPANTS AND THEIR USE IN HYDRAULIC FRACTURING

BACKGROUND OF THE INVENTION

1. Field of the Invention

The present invention relates generally to lightweight proppants for oil and gas wells and more particularly to lightweight proppants having a specific gravity of about 1.3 or less.

2. Description of the State of Art

After a well has been drilled to the projected depth and the production formations have been evaluated as economical to produce, the work of setting the casing, preparing the well for production, and bringing in the oil or gas begins. In general, many oil and gas wells 10, shown in FIG. 1, require four concentric strings of large pipe: conductor pipe 12, surface casing 14, intermediate casing 16 and production casing 18. Conductor pipe 12 is cemented C in place and prevents the hole from caving in at the surface and endangering the drilling rig foundation, not shown. Surface casing 14 is set and cemented in place to provide protection for fresh water formation. Surface casing 14 also prevents loose shell and sand or gravel from falling into the hole or wellbore B and affords a means for controlling the flow of fluid from the well 10. Intermediate casing 16 may be needed if troublesome zones are encountered below the surface casing 14 and above the final depth of the well 10. The final casing for most wells is the production casing 18 which is also set in cement.

Once the process of setting the production casing 18 in place has been accomplished the well next undergoes completion. The type of completion method used is determined by the characteristics of the reservoir and its economical potential. The perforated completion, which is by far the most popular method of completing a well, is accomplished by piercing the production casing wall 20 and the cement C thereby providing openings through which formation fluids may enter the wellbore B. Piercing the casing 18 is accomplished by lowering a perforating gun (not shown) down the production casing 18 until it is opposite the zone to be produced. The gun is fired to set off special explosive charges known as shaped charges that are designed so that an intense, direction explosion is formed resulting in perforations 22.

Since oil and gas usually exist in the pores of the formation surrounding the wellbore B, enlarging or creating new channels causes the oil or gas to move more readily to a well 10. Hydraulic fracturing, shown in FIG. 2, is a well stimulation process of injecting fluids (not shown) into a selected oil or gas bearing subsurface earth formation traversed by a wellbore B at sufficiently high rates and pressures such that the formation fails in tension and fractures to accept the fluid. In order to hold the fracture F open once the fracturing pressure is released a propping agent P or proppant is mixed with the fluid which is injected into the formation. Hydraulic fracturing is used to accomplish three tasks: (1) create penetrating reservoir fractures to improve the productivity of a well, (2) improve the ultimate recovery from a well by extending the flow channels further into the formation, and (3) aid in improved recovery operations.

To achieve the maximum width of a propped fracture upon release of the fracturing pressure and thus the maximum flow of fluids from an oil or gas reservoir to a wellbore B the transport and placement of proppant are of major importance. Both transport and placement of proppant rely on the ability of the fluid to carry the proppant into the fracture. If the specific gravity of proppant to the specific gravity of fluid ratio is greater than about 2 to 1 the proppant will not be carried or transported into the fracture with the fluid; but instead, will fall out of the fluid commonly referred to as "screen-outs" and fill up the bottom of the well. Therefore, as the specific gravity of the proppant increases a higher viscosity fracturing fluid is required to transport the proppant. See "Factors Affecting Gravel Placement in Long Deviated Intervals", SPE 19400:7–20, Formation Damage Control Symposium, Lafayette, La., February, 1990.

In general, proppants are strong particles that are capable of withstanding the high temperatures and pressures associated with a fracture. Early proppants were formed of materials such as sand, glass beads, walnut shells, and aluminum pellets. However, where closure pressures of the fracture exceed a few thousand pounds per square inch these materials are crushed resulting in a closure of the fracture. In response, proppants having high compressive strength have been designed to resist crushing under high pressure levels experienced in use. While these proppants prove to have sufficient strength to resist crushing they also have high specific gravities of about 2.0 or more requiring the use of higher viscosity fracturing fluids. The conductivity or crushability of a proppant under specific conditions of stress, temperature, corrosive environment and time is the single most important measure of its quality.

It is well recognized that a side-effect of all fracturing operations with high viscosity or gelled fluid is the potential for formation damage from filtrate invasion. R. Puri, et al. in their scientific paper entitled "Damage to Coal Permeability during Hydraulic Fracturing," SPE 21813:109–115, Proc. Rocky Mountain Regional and Low-Permeability Reservoirs Symposium, Denver, April, 1991, disclosed that higher viscosity fracturing fluids cause damage that is irreversible to coal permeability. Coal consists of a highly cross-linked macromolecular network and other uncross-linked macromolecular chains. Therefore, coal has a high capacity to sorb a wide variety of liquids and gases. Field studies reported by Puri et al. demonstrate that 20–30% of the injected frac gel volume is not recovered, and is suspected to be trapped in the coal. Furthermore, "it appears that even water containing low concentrations of friction reducing polymers can cause significant damage to coal permeability. These results are alarming since extensive damage to permeability by gelled fluids and friction reducing polymers could negate most of the benefits of a large effective wellbore radius created during an expensive fracture stimulation . . . . It is recommended that every effort be made to avoid contacting coals with gelled fluids, polymers, or liquid chemicals. Furthermore, remedial workover treatment should be considered for coal wells that could have been damaged in the past by hydraulic fracture stimulation." Id. at 109.

There is still a need, therefore, for a proppant having a specific gravity of 1.3 or lower that maintains sufficient compressive strength to resist fragmentation under high stress levels thus alleviating the need to use viscous fluids.

SUMMARY OF THE INVENTION

Accordingly, it is an object of this invention to provide a high strength proppant having a specific gravity approximately equal to the specific gravity of water.

Another object of the present invention is to reduce the use of high viscosity fluids in hydraulic fracturing operation.

Additional objects, advantages, and novel features of this invention shall be set forth in part in the description and examples that follow, and in part will become apparent to those skilled in the art upon examination of the following specification or may be learned by the practice of the invention. The objects and advantages of the invention may be realized and attained by means of the instrumentalities, combinations, compositions, and methods particularly pointed out in the appended claims.

To achieve the foregoing and other objects and in accordance with the purposes of the present invention, as embodied and broadly described therein the method of this invention comprises injecting fluids into a fluid bearing subsurface earth formation traversed by a wellbore at sufficiently high rates and pressures such that the formation fails and fractures to accept the fluid, whereupon a high strength proppant having a specific gravity of less than 1.3 is mixed with the fluid and transported to the resulting fractures.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The accompanying drawings, which are incorporated in and form a part of the specifications, illustrate the preferred embodiments of the present invention, and together with the descriptions serve to explain the principles of the invention.

In the Drawings:

FIG. 1 is a cross-sectional view of a typical well after completion and stimulation by hydraulic fracturing.

FIG. 2 is a plan view of a propped fracture shown in FIG. 1 taken along lines 2—2 of FIG. 1.

FIG. 3 is a superimposed plot of conductivity versus closure for 3.2%, 5.0%, 8% styrene-divinylbenzene copolymer (SDVB) beads of the present invention and 20/40 Jordan Sand.

FIG. 4 is a superimposed plot of permeability versus closure for 3.2%, 5.0%, 8% styrene-divinylbenzene copolymer (SDVB) beads of the present invention and 20/40 Jordan Sand.

FIG. 5 is a post photomicrograph of the present invention proppant pack showing proppant deformation.

DETAILED DESCRIPTION OF THE PREFERRED EMBODIMENT

In general the present invention relates to lightweight proppants made from styrene-divinylbenzene copolymer or SDVB beads having varying composition percentages of divinylbenzene for oil and gas wells. The use of styrene-divinylbenzene beads as propping agents is particularly useful in fracturing operations due to their low specific gravity and high strength.

Figure 1:
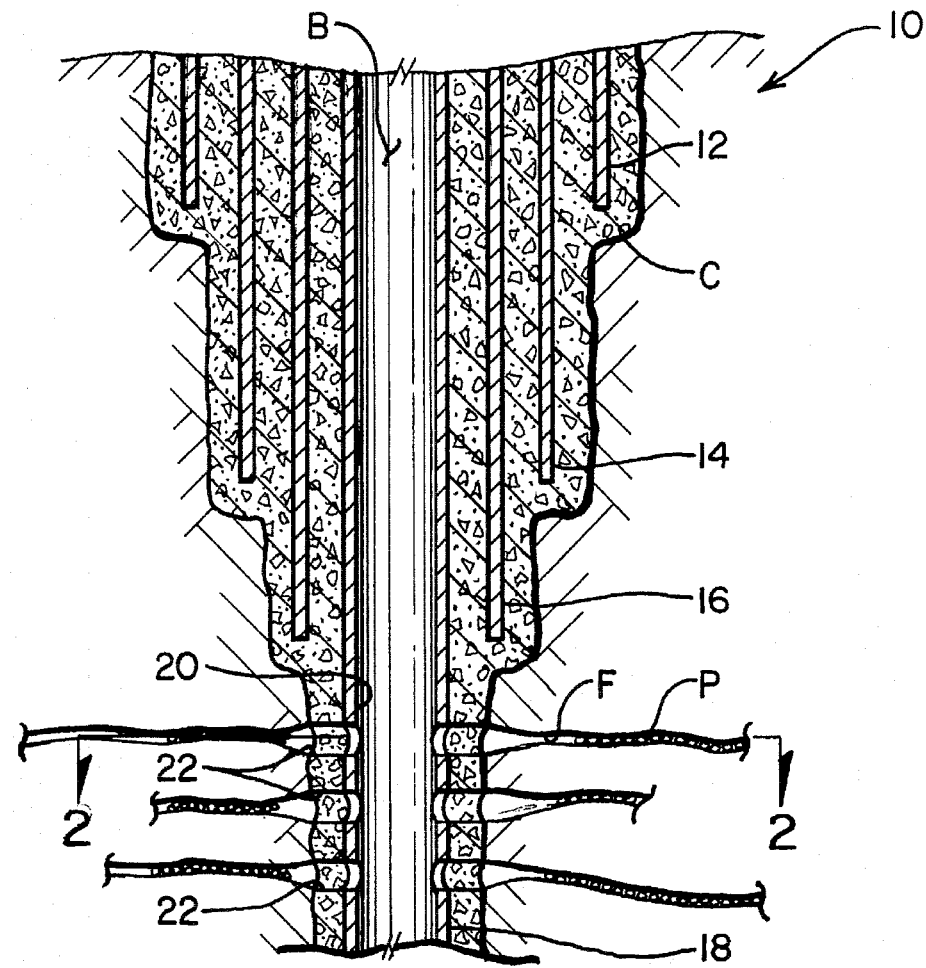
Figure 2:
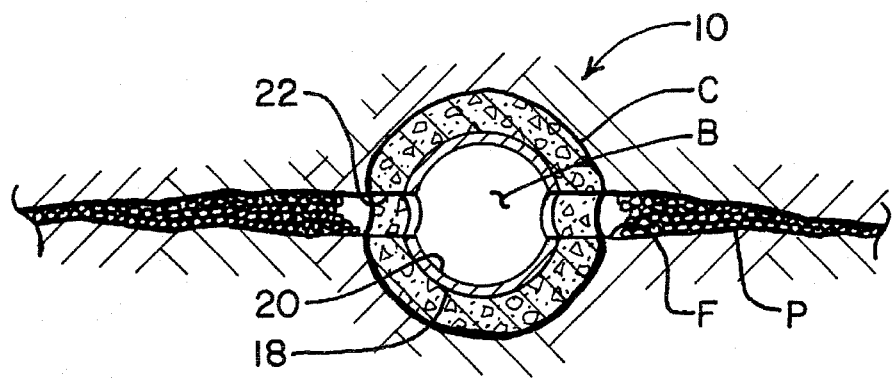
Figure 3:
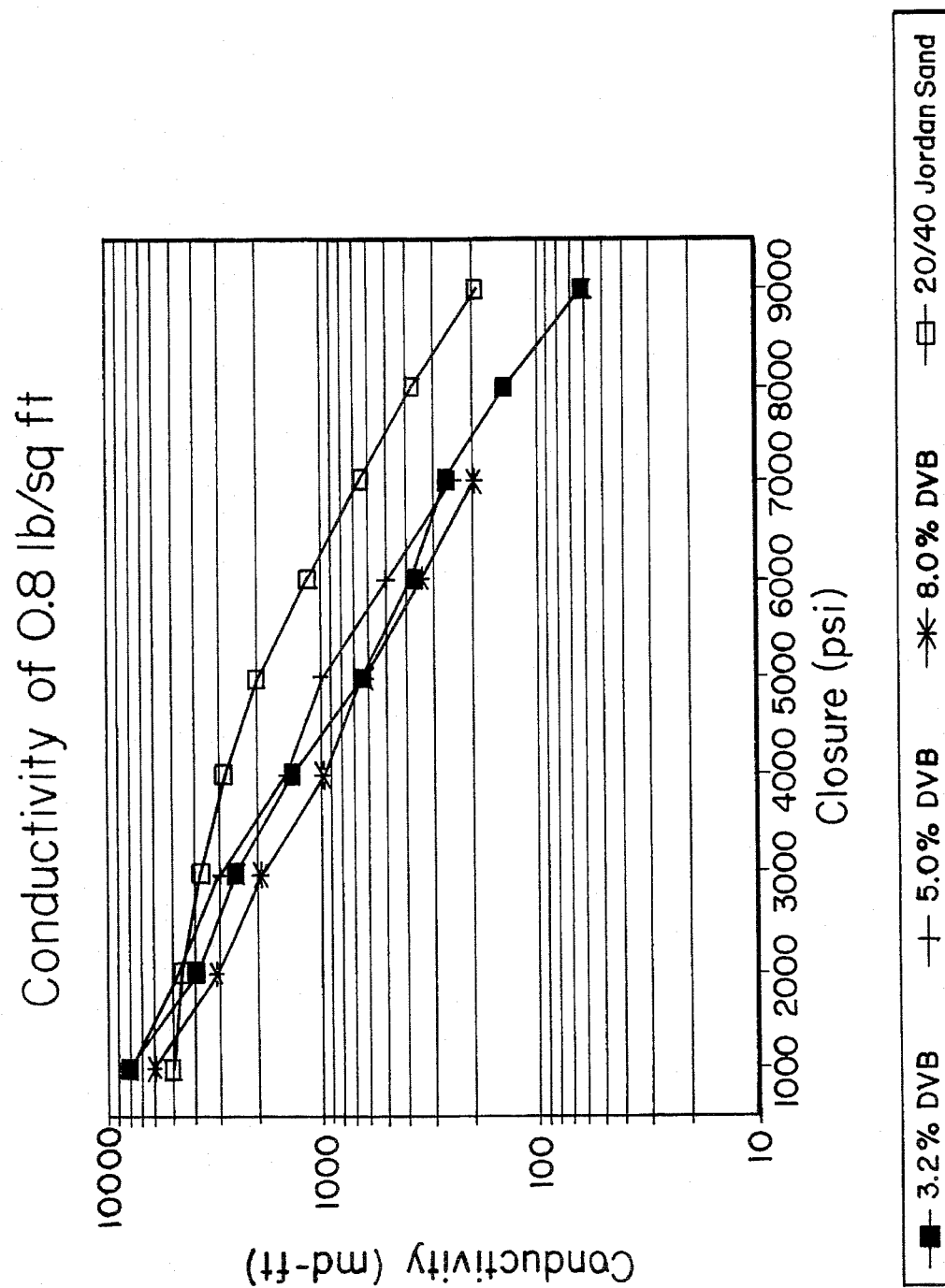
Figure 4:
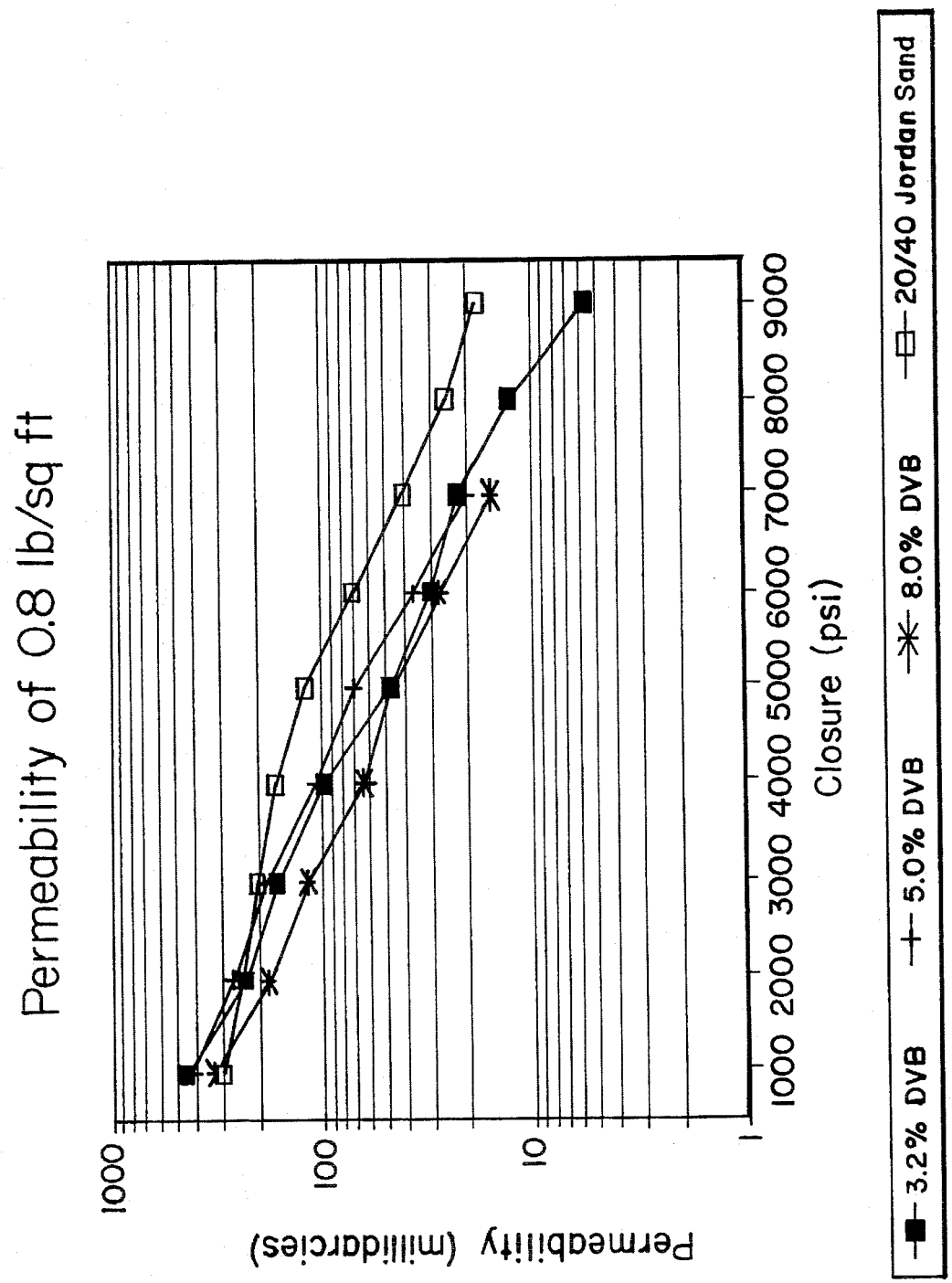

Hydraulic fracturing according to the present invention may be accomplished by mixing styrene-divinylbenzene copolymer (SDVB) beads with a water or brine carrying solution which is pumped into a formation at a high rate, causing fractures in the formation. The SDVB beads moving with the water through these fractures is effective at propping resulting fractures open even in a closure pressure of 8000 pounds per square inch. The SDVB beads may be composed of 3–80 percent divinylbenzene and preferably have 3–10 percent divinylbenzene and can be purchased from Dow Chemical. As shown in FIGS. 3 and 4 the conductivity and permeability, respectively, of the SDVB beads of the present invention are surprisingly only slightly outperformed by the test standard, Jordan Sand. However, the advantages of the very low specific gravities of the SDVB beads are such that a viscous fluid is not required to carry the beads to the fracture as is the case with Jordan Sand and the beads are more effectively transported placed within the fracture. Thus alleviating formation damage associated with the use of viscous fluids.

The following non-limited examples provide specific data for the use SDVB beads of the present invention as proppants. All scientific and technical terms have the meanings as understood by one with ordinary skill in the art. All tests were performed by an independent lab, Stim-Labs, Inc. of Duncan, Okla. The testing techniques used to determine the conductivity of the proppants of the present invention were conducted by Stim-Labs, Inc. in accordance with API RP 61 which is described in a publication by the American Petroleum Institute entitled "Recommended Practices For Evaluating Short Term Proppant Pack Conductivity" First Edition, Oct. 1, 1989, which publication is hereby incorporated by reference. The recommended practices were prepared by the Task Group on Conductivity Testing of Proppants under the API Subcommittee on Evaluation of Well Completion Materials to establish standard procedures and conditions for use in evaluating the short term conductivity of various fracture proppant materials under laboratory conditions.

EXAMPLES

Conductivity tests were conducted by Stim-Lab, Inc., in accordance with API RP 61. In accordance with this procedure SDVB beads were loaded into an API Monel K-500 10 in$^2$ linear flow cell to give a loading of 0.8 lbs/ft$^2$ of proppant and leveled loosely with a universal level blade device. The proppant samples were placed between Ohio Sandstone and were made a part of a cell stack. The cells were stacked to within 0.005 inch from top to bottom and positioned between the plattens of a 75 ton Drake Press and the closure stress was increased to 300 psi. The cell was saturated with deoxygenated aqueous 2% KCl solution and then purged of air at the ambient laboratory temperatures of 72° F. A Validyne DP 15-32 differential pressure transducer, for measuring pressure drop and rate, connected across the cell using ¼" lines was calibrated to 5 mm water. Once saturated, the closure pressure was increased to 500 psi, at a rate of 100 psi/min.

The system was allowed 30 minutes to come to equilibrium and a series of five conductivity measurements were taken and averaged. The flow rate, pressure differential, and average width were measured at each pressure to calculate conductivity and permeability. Five measurements were taken and averaged to arrive at each conductivity. Flow rate was measured with a Mettler balance to 0.01 ml/min. The conductivity was calculated from the darci relationship:

$$K_{wf} = 26.78 \mu\, Q/P$$

where $K_{wf}$=Conductivity (md-ft)

26.78=factor to account for a 1½×5 inch flow area and pressure in psi $\mu$=viscosity of flowing fluid at temperature ($c_1$)

Q=Flow rate (ml/min)

P=Pressure differential across 5 inch flow path

Figure 5:

Readings were taken at 1,000 psi increments starting at 1,000 psi up to 9,000 psi for SDVB beads having 3.2%, 5.0%, 8.0%, 20%, 50% and 80% composition of divinylbenzene. The results are summarized in Tables 1 and 2 below. As shown in FIG. 5 the SDVB of the present invention display some proppant deformation; however the beads were not crushed.

TABLE I

CONDUCTIVITY (Md/Ft)
of Styrene-divinylbenzene copolymer beads
having varying percentages of divinylbenzene

| Closure (PSi) | 3.2% | 5.0% | 8.0% | 20% | 50% | 80% |
|---|---|---|---|---|---|---|
| 1000 | 8228 | 7693 | 6074 | 4173 | 4363 | 4652 |
| 2000 | 3897 | 4710 | 3118 | 2234 | 3599 | 3599 |
| 3000 | 2591 | 2981 | 1931 | 1428 | 1807 | 2673 |
| 4000 | 1385 | 1456 | 984 | 642 | 1259 | 2077 |
| 5000 | 653 | 1016 | 671 | 374 | 867 | 1413 |
| 6000 | 390 | 506 | 368 | 257 | 696 | 1199 |
| 7000 | 275 | 263 | 200 | 110 | 444 | 871 |
| 8000 | 149 | — | — | 74 | 367 | 637 |
| 9000 | 63 | — | — | — | — | — |

TABLE II

PERMEABILITY (DARCIES)
of Styrene-divinylbenzene copolymer beads
having varying percentages of divinylbenzene

| Closure (PSi) | 3.2% | 5.0% | 8.0% | 20% | 50% | 80% |
|---|---|---|---|---|---|---|
| 1000 | 443 | 410 | 328 | 241 | 253 | 237 |
| 2000 | 237 | 272 | 183 | 134 | 217 | 194 |
| 3000 | 165 | 183 | 121 | 92 | 115 | 153 |
| 4000 | 98 | 97 | 66 | 43 | 83 | 123 |
| 5000 | 47 | 70 | 47 | 26 | 59 | 88 |
| 6000 | 30 | 36 | 27 | 19 | 49 | 76 |
| 7000 | 22 | 20 | 16 | 9 | 33 | 59 |
| 8000 | 13 | — | — | 6 | 28 | 49 |
| 9000 | 6 | — | — | — | — | — |

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. A method of fracturing a subsurface earth formation having a wellbore, comprising:

injecting into the wellbore a fluid at sufficiently high rates and pressures such that the formation fails and fractures to accept said fluid;

mixing a proppant into said fluid being injected into the wellbore, wherein said proppant is a styrene-divinylbenzene copolymer bead; and filtering out said proppant from said fluid so as to produce a packed mass of particles adjacent the fracture, which packed mass will prop open the fracture thereby allowing produced fluids to flow towards the wellbore.

2. The method of claim 1, wherein said fluid is unviscosified water.

3. The method of claim 1, wherein said fluid is a brine solution.

4. The method of claim 1, wherein said styrene-divinylbenzene copolymer bead has a percentage composition of divinylbenzene in the range of 3–80%.

5. The method of claim 1, wherein said styrene-divinylbenzene copolymer bead has a percentage composition of divinylbenzene in the range of 3–10%.

6. The method of claim 1, wherein said proppant when mixed with said fluid has a specific gravity ratio of proppant to fluid of less than 1.3 to 1.

7. The method of claim 1, wherein said fluid is unviscosified water.

8. The method of claim 1, wherein said fluid is brine.

9. A method of fracturing a subsurface earth formation having a wellbore, comprising:

injecting into the wellbore a fluid at sufficiently high rates and pressures such that the formation fails and fractures to accept said fluid;

mixing styrene-divinylbenzene copolymer beads into said fluid such that the specific gravity of said beads to said fluid ratio is less than 1.3 to 1, and said beads having a percentage composition of divinylbenzene in the range of 3–10%; and filtering out said beads from said fluid so as to produce a packed mass of particles adjacent the fracture, which packed mass will prop open the fracture thereby allowing produced fluids to flow toward the wellbore.

* * * * *